(12) United States Patent
Malley et al.

(10) Patent No.: US 11,261,933 B2
(45) Date of Patent: Mar. 1, 2022

(54) PENDULUM DAMPING DEVICE

(71) Applicant: VALEO EMBRAYAGES, Amiens (FR)

(72) Inventors: Matthieu Malley, Amiens (FR); Olivier Fafet, Amiens (FR); Antoine Vigreux, Amiens (FR); Didier Couvillers, Amiens (FR); David Salvadori, Amiens (FR); Franck Cailleret, Amiens (FR); Adrien Nerriere, Amiens (FR); Jonathan Rost, Auburn Hills, MI (US)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 16/644,745

(22) PCT Filed: Sep. 6, 2018

(86) PCT No.: PCT/FR2018/052170
§ 371 (c)(1),
(2) Date: Mar. 5, 2020

(87) PCT Pub. No.: WO2019/048779
PCT Pub. Date: Mar. 14, 2019

(65) Prior Publication Data
US 2021/0062891 A1    Mar. 4, 2021

(30) Foreign Application Priority Data
Sep. 6, 2017    (FR) ...................... 1758233

(51) Int. Cl.
*F16F 15/14*    (2006.01)
(52) U.S. Cl.
CPC ................ *F16F 15/145* (2013.01)

(58) Field of Classification Search
None
See application file for complete search history.

(56) References Cited

U.S. PATENT DOCUMENTS

| 6,109,134 A * | 8/2000 | Sudau ............... F16F 15/13157 192/207 |
| 2015/0369334 A1 | 12/2015 | Dinger et al. |
| 2017/0268600 A1 * | 9/2017 | Hennebelle ........... F16F 15/145 |

FOREIGN PATENT DOCUMENTS

| DE | 10 2014 202 552 A1 | 8/2014 |
| EP | 3 190 310 A1 | 7/2017 |
| WO | WO 2017/089442 A1 | 6/2017 |

OTHER PUBLICATIONS

International Search Report dated Nov. 2, 2018 in PCT/FR2018/052170 filed Sep. 6, 2018, 2 pages.

* cited by examiner

*Primary Examiner* — Vicky A Johnson
(74) *Attorney, Agent, or Firm* — Oblon, McClelland, Maier & Neustadt, L.L.P.

(57) ABSTRACT

A pendulum damping device including a support that rotates about an axis, at least one pendulum body and at least one rolling member guiding the movement of the pendulum body relative to the support, the rolling member engaging with at least one rolling track rigidly connected to the support and with at least one rolling track rigidly connected to the pendulum body. The rolling member includes a first part defining a first axial end, a second part defining a second axial end, and a resilient element arranged in the rolling member so as to axially separate these two parts so that the rolling member exerts an axial clamping force on one of the pendulum body and the support during the movement of the pendulum body relative to the support.

20 Claims, 9 Drawing Sheets

PENDULUM DAMPING DEVICE

The present invention relates to a pendulum damping device, particularly for a motor vehicle power train.

In such an application, the pendulum damping device can be incorporated into a torsion damping system of a clutch capable of selectively connecting the internal combustion engine to the gearbox, in order to filter the vibrations due to the engine acyclisms. Such a torsion damping system is for example known as a dual mass flywheel.

In one variant, in such an application, the pendulum damping device can be incorporated into a clutch disc of the clutch or a hydrodynamic torque converter.

Such a pendulum damping device conventionally implements a support and one or more pendulum body(ies) that is/are mobile relative to this support, the movement of each pendulum body relative to the support being guided by two rolling members engaging with rolling tracks rigidly connected to the support, and with rolling tracks rigidly connected to the pendulum bodies. Each pendulum body comprises for example two pendulum masses riveted to each other.

When the engine stops, the pendulum bodies are no longer centrifuged, so that depending on their position, they can drop radially. This radial dropping of the pendulum bodies can also be accompanied by the radial dropping of the rolling members that guide the movement of the pendulum bodies, causing noise and premature wear of the dropped parts.

WO2017/089442 discloses the creation of axial clamping between a rolling member of a pendulum body with two pendulum masses and this pendulum body, and the insertion of an elastic element between at least one end of this rolling member and the mass of the pendulum body facing this end, so as to allow the creation of friction between the rolling member and this pendulum body. Although such friction via an elastic element can fully or partially overcome the drawback of the radial dropping of the rolling member, it can lead to premature wear of this elastic element.

There is a need to generate axial clamping between a rolling member for a pendulum damping device and one of the support and the pendulum body of this pendulum damping device, while overcoming the aforementioned drawback.

The invention aims to meet this need and achieves this, according to one aspect thereof, using a pendulum damping device comprising:
  a support capable of rotating about an axis,
  at least one pendulum body and
  at least one rolling member guiding the movement of the pendulum body relative to the support, the rolling member engaging with at least one rolling track rigidly connected to the support and with at least one rolling track rigidly connected to the pendulum body,
the rolling member comprising:
  a first part defining a first axial end,
  a second part defining a second axial end, and
  an elastic element arranged in the rolling member so as to axially separate these two parts so that the rolling member exerts an axial clamping force on one of the pendulum body and the support during the movement of the pendulum body relative to the support.

According to the invention, the axial clamping that exists between the rolling member and the pendulum body or between the rolling member and the support respectively, makes it possible to limit the risk of radial and/or angular movement of the rolling member relative to the pendulum body or relative to the support respectively, when the internal combustion or electric engine of the vehicle stops.

In variants of the invention, the axial clamping between the rolling member and the support or the pendulum body is partially exerted via direct contact between a tensioned elastic element held by the rolling member and this body, or partially via direct contact between a tensioned elastic element held by the rolling member and this support. Such a structure facilitates the insertion of the rolling member into the pendulum body.

In preferred variants, the axial clamping between the rolling member and the support or the pendulum body is not exerted via direct contact between an elastic element held by the rolling member and this body, or via direct contact between an elastic element held by the rolling member and this support, but via direct contact between a part of the rolling member tensioned by the elastic element and this pendulum body or this support. The function provided by the elastic element is thus retained while protecting it against premature wear.

According to the invention, the axial clamping between the rolling member and the pendulum body or between the rolling member and the support respectively, does not give rise to direct contact between the elastic element of the rolling member and this pendulum body, or between the elastic element of the rolling member and this support respectively. The elastic element can be entirely contained inside the axial space one end of which is formed by the first part of the rolling member and the other end of which is formed by the second part of the rolling member.

In the present application:
  "axially" means "parallel to the axis of rotation of the support" when reference is made to the support and the pendulum body, and "axially" means "parallel to the longitudinal axis of the rolling member" when reference is made to the rolling member,
  "radially" means "along an axis belonging to a plane orthogonal to the axis of rotation of the support and intersecting this axis of rotation of the support" when reference is made to the support and the pendulum body, and "radially" means "along an axis belonging to a plane orthogonal to the longitudinal axis of the rolling member and intersecting this longitudinal axis" when reference is made to the rolling member,
  "angularly" or "circumferentially" means "about the axis of rotation of the support",
  "orthoradially" means "perpendicular to a radial direction",
  "rigidly connected" means "rigidly coupled", and
  the rest position of the device is the position in which the pendulum bodies are subjected to a centrifugal force, but not to torsional oscillations originating from the acyclisms of the internal combustion engine,
  "an elastic element arranged in the rolling member" means that at least part of the elastic element is situated axially between the first axial end and the second axial end of the rolling member. The entire elastic element can be situated axially between the first axial end and the second axial end of the rolling member.

The pendulum damping device can comprise a single support, in which case the pendulum body can comprise: first and second pendulum masses axially spaced apart from each other and mobile relative to the support, the first pendulum mass being arranged axially on a first side of the support, and the second pendulum mass being arranged axially on a second side of the support, and at least one connecting member of the first and second pendulum masses pairing said masses. In this case, the first part of the rolling member guiding the movement of the pendulum body relative to the support is axially facing the first pendulum mass, while the second part of this rolling member is axially facing the second pendulum mass, and the elastic element axially separates these two parts so that the rolling member exerts an axial clamping force on at least one of the pendulum masses during the movement of the pendulum body relative to the support.

In one variant, the pendulum damping device comprises two rigidly connected and axially offset supports between which the pendulum body is axially arranged. The pendulum body can in this case comprise a single mass or several separate masses positioned axially in succession that are or are not rigidly connected to each other. In this case, the first part of the rolling member guiding the movement of the pendulum body relative to the support is axially facing the first of the two supports, and second part of this rolling member is axially facing the second of the two supports, and the elastic element axially separates these two parts so that the rolling member exerts an axial clamping force on at least one of the two supports during the movement of the pendulum body relative to the supports.

The rolling member can exert an axial clamping force on just one of the pendulum masses of the pendulum body, or on just one of the two supports respectively, during the movement of this pendulum body relative to the support.

In one variant, the rolling member can exert an axial clamping force on each pendulum mass of the pendulum body, or on each support respectively, during the movement of the pendulum body relative to the support.

According to a first embodiment of the invention, the elastic element can have at least one portion received axially inside a cavity made in one of the first part and the second part of the rolling member. Due to the existence of this cavity, the rolling member can weigh less than it would in the absence of a cavity. A reduction of the order of approximately 30% of the weight of the rolling member is for example possible. The following advantages can be obtained when the rolling member weighs less: reduction of the centrifugal force applied to the support(s) of the pendulum damping device, reduction of the Hertz contact stresses, and reduction of the inertial effects affecting the torsional oscillation filtering performance of the pendulum damping device.

The elastic element can be fixed in this cavity, being for example force-fitted into this cavity, snap-fitted, bonded or fixed in this cavity via an overmolding operation. In one variant, the elastic element is mounted free in the cavity, it being held in the cavity for example by the geometry thereof.

The cavity can extend from a bottom wall. This bottom wall can extend orthogonally to the longitudinal axis of the rolling member, the latter being particularly parallel to the axis of rotation of the support. When the cavity is made in the first part of the rolling member, it thus extends from the bottom wall towards the second part. When the cavity is made in the second part of the rolling member, it extends from the bottom wall towards the first part.

The bottom wall can be solid or closed, that is, without holes, or the bottom wall can comprise a hole. In such a case, the first part can then be hollowed out, having a through-hole. Due to the presence of such a hole, a passage for a lubricant can be made and/or the weight of the rolling member can be further reduced.

The bottom wall can have a flat shape. In one variant, this bottom wall can have a stepped shape. The central area of this bottom wall is for example closer to the part of the rolling member towards which the cavity extends than the rest of this bottom wall.

The bottom wall can define an axial stop for the elastic element received in the cavity. The cavity can extend axially along a side wall from the bottom wall. This side wall can be cylindrical or otherwise. The dimension of the cavity along this side wall can remain constant or otherwise. In one example, the dimension of the cavity increases moving away from the bottom wall.

Only the first part of the rolling member can have a cavity. In such a case, the elastic element can extend in this cavity and press against the second part without necessarily being received in a cavity of this second part.

In one variant, the elastic element can have a first portion received axially inside a cavity made in the first part of the rolling member and a second portion received axially inside a cavity made in the second part of the rolling member. In this case, a cavity is made in each of the first part and the second part of the rolling member. In a cross-sectional view of the rolling member in a plane containing the longitudinal axis of this rolling member, each of the first and second parts of this rolling member can be C-shaped.

The elastic element can be fixed in each of the cavities of the rolling member, fixed in just one of the two cavities or be mounted free in each cavity, being held in this case in these cavities by the geometry thereof. Each of these cavities can have one of the shapes mentioned above, that is, bottom wall closed or otherwise, flat or otherwise, side wall cylindrical or otherwise, etc.

According to this variant, the elastic element can be received over its entire axial dimension inside the axial space occupied by one and/or the other of the first part of the rolling member and the second part of the rolling member.

According to this first embodiment of the invention, and when a cavity is made in each part of the rolling member, one of the first part and the second part of the rolling member can be arranged inside the other of the first part and the second part of the rolling member.

The second part of the rolling member extends for example partially inside the cavity of the first part of the rolling member. In this case, this cavity made in the first part of the rolling member receives: a portion of the elastic element and a fraction of the second part of the rolling member, while this fraction of the second part of the rolling member also partially receives the elastic element. In other words, there is an axial fraction of the elastic element that is received both inside the first part of the rolling member and inside the second part of the rolling member.

When one of the first part of the rolling member and the second part of the rolling member is received inside the other of the first part of the rolling member and the second part of the rolling member, this other part of the rolling member can engage with the rolling track rigidly connected to the support and/or with the rolling track rigidly connected to the pendulum body. In one variant, each of the first and second parts of the rolling member engages with the rolling track rigidly connected to the support and/or with the rolling track rigidly connected to the pendulum body.

According to this first embodiment of the invention, and when a cavity is made in each part of the rolling member, one of the first part and the second part of the rolling member can be arranged mirroring the other. Each part of the rolling member can engage with part of the rolling track rigidly connected to the support and/or with part of the rolling track rigidly connected to the pendulum body.

Each of the cavities of the first part and the second part of the rolling member comprises an outer face that can extend radially from one of the ends of the side wall. Each outer face can be parallel to the first axial end and/or the second axial end.

When one of the first part of the rolling member and the second part of the rolling member mirrors the other, the outer faces of the side walls of the parts of the rolling member face each other and can be parallel.

When the first part of the rolling member mirrors the second part of the rolling member, each of the thicknesses measured between the side wall of each cavity and an outer cylindrical surface, preferably capable of acting as a rolling surface on the rolling tracks, are identical. These thicknesses can however vary.

In one variant, the elastic element can be received inside the space formed by the cavities of the rolling member. The outer diameter of the elastic element corresponds substantially to the inner diameter of the cavities of the rolling member.

According to one variant of this first embodiment, the elastic element can be fixed to the outer face of one of the first part and the second part of the rolling member. The elastic element is fixed to one of the first part and the second part of the rolling member. The other of the first part and the second part of the rolling member is arranged captive in the center of the elastic element.

The cavity of one of the first part and the second part of the rolling member on the outer face of which the elastic element is fixed is capable of at least partially accommodating the elastic element and the other of the first part and the second part of the rolling member. The other of the first part and the second part of the rolling member has an outer diameter smaller than the inner diameter of the side wall of the cavity of the one of the first part and the second part of the rolling member. The other of the first part and the second part of the rolling member can thus be accommodated in the cavity of the one of the first part and the second part of the rolling member. The elastic element thus arranged in the rolling member axially separates these two parts so that the rolling member exerts an axial clamping force on one of the pendulum body and the support during the movement of the pendulum body relative to the support. This variant makes it possible to save axial space while retaining a wide rolling surface on the outside of the rolling member.

According to this first embodiment of the invention, the first axial end and/or the second axial end of the rolling member can be provided with an additional friction element. The friction element further attenuates the noise and wear of the rolling member.

According to this first embodiment of the invention, the elastic element can be chosen from: a flat or tapered coil spring, a wave washer, a Belleville washer, a flexible leaf, a washer with at least two arms or an elastomer block.

According to this first embodiment, each of the first and second parts of the rolling member can be made from metal, for example steel. In one variant according to this first embodiment, and particularly when one of the parts of the rolling member is arranged inside the other part of the rolling member, this part on the inside can be made from plastic and rub against a pendulum mass, or rub against a support respectively, while the part of the rolling member on the outside and engaging with the rolling track rigidly connected to the support and/or with the rolling track rigidly connected to the pendulum body is made from metal, particularly steel.

According to a second embodiment of the invention, the elastic element can locally define the periphery of the rolling member, between the first part and the second part of the rolling member. In other words, and unlike in the first embodiment, the elastic element does not in this case extend inside a cavity made in one and/or the other of the first part of the rolling member and the second part of this rolling member.

According to this second embodiment, the elastic element is for example a washer squeezed between the first part and the second part of the rolling member when the axial clamping force is exerted. In one variant, the element can be a coil spring or an elastomer block squeezed between the first and second parts when the axial clamping force is exerted.

This washer has for example an annular central part from which a plurality of arms extend radially outwards. These arms can be distributed evenly about the longitudinal axis of the rolling member. In one variant, the washer can not be provided with arms and/or can be a wave washer.

The first part can comprise a first fastening part and a rolling part, the second part comprising a second fastening part, and the rolling member can comprise axially in succession: the first fastening part, the rolling part, the elastic element and the second fastening part. In such a case, the elastic element can push the second fastening part against the second pendulum mass, or against the second support respectively. The second fastening part can be made from a material chosen to have a coefficient of friction that makes it possible to prevent or reduce any relative radial and/or angular movement between the rolling member and the second pendulum mass, or between the rolling member and the second support respectively, on radial dropping due to the internal combustion or electric engine of the vehicle stopping.

The second fastening part is for example made from metal or plastic.

According to this second embodiment, the rolling member can be made up of: the first fastening part, the rolling part, the elastic element and the second fastening part.

The rolling part is for example hollow and the first fastening part and the second fastening part are fastened inside the rolling part.

The first fastening part and the second fastening part are for example configured to establish a removable fastening between them. Such a fastening can be unfastened without it being necessary to destroy the first and/or the second fastening part. The fastening takes place for example by snap-fitting, one and/or the other of the first and second fastening parts holding catches in this case.

The rolling member formed by the first fastening part, the elastic element, the rolling part and the second fastening part can form a sub-assembly that can be handled as such on assembly of the pendulum damping device.

In one particular example, the rolling part is made from metal, for example steel, while the first fastening part is plastic and the second fastening part is plastic.

In one variant of the second embodiment, the elastic element can be incorporated into the first and/or the second part of the rolling member. The elastic element and the first part and/or the second part can form a single part. The part of the rolling member that is not separate from the elastic element can have an annular shape. The elastic element is arranged either on the inside or on the outside of the annular shape.

In one variant of this second embodiment, two elastic elements can be present, whether these are identical or not.

In this case, the rolling member can comprise, particularly be made up of the first fastening part, a first elastic element, the rolling part, a second elastic element and the second fastening part, and these components are positioned axially in succession.

In another variant of this second embodiment, the first part is only formed by the rolling part, and the second fastening part forms the second part and is fastened directly to the rolling part. Fastening bosses are then made in the fastening part. The elastic element is in this case still squeezed between the rolling part and this second fastening part when the axial clamping force is exerted.

The rolling part can have an outer surface engaging with the rolling track rigidly connected to the support and with the rolling track rigidly connected to the pendulum body.

Everything below applies equally to the first and second embodiments mentioned above.

Each rolling member can engage with the rolling track rigidly connected to the support and with the rolling track(s) rigidly connected to the pendulum body via its outer surface only.

The shape of the first and second rolling tracks can be such that each pendulum body is only translated relative to the support about a fictitious axis parallel to the axis of rotation of the support.

In one variant, the shape of the rolling tracks can be such that each pendulum body is both:
- translated relative to the support about a fictitious axis parallel to the axis of rotation of the support, and
- rotated relative to the support about the center of gravity of said pendulum body, such movement also being called "combined movement".

The device comprises for example a number of pendulum bodies between two and eight, particularly three or six.

All of these pendulum bodies can be positioned in succession circumferentially. The device can thus comprise a plurality of planes perpendicular to the axis of rotation in each of which all of the pendulum bodies are arranged.

The movement of each pendulum body relative to the support can be guided by at least two rolling members, particularly exactly two rolling members. In this case, each rolling member exerts axial clamping on at least one of the pendulum masses of the pendulum body, or exerts axial clamping on at least one of the two supports respectively. For example, each rolling member only exerts axial clamping on the first pendulum mass of the pendulum body without exerting axial clamping on the second pendulum mass of the pendulum body, or exerts clamping on the first support without exerting axial clamping on the second support respectively. In one variant, each rolling member exerts axial clamping on each of the pendulum masses of the pendulum body, or exerts axial clamping on each support respectively. In another variant, just one of the rolling members guiding the movement of the pendulum body exerts axial clamping on the pendulum mass(es) of this pendulum body, or exerts axial clamping on the support(s) respectively.

Each rolling member exerts for example on the pendulum body or on the support with which it interacts axial clamping corresponding to a tangential force of between 0.15 N and 1.5 N.

In all of the above, each pendulum body can comprise at least one member for damping stopping against the support. Each of these damping stop members can in this case come into contact with the support to damp the stopping of the pendulum body against it, for example:

- following a movement in a counter-clockwise direction of this pendulum body from the rest position to filter a torsional oscillation, and/or
- following a movement in a clockwise direction of this pendulum body from the rest position to filter a torsional oscillation, and/or
- if the pendulum body drops radially, for example when the internal combustion engine of the vehicle stops.

If applicable, each damping stop member can dampen the stopping of the pendulum body against the support following a movement in a counter-clockwise direction from the rest position, following a movement in a clockwise direction from the rest position, but also if the pendulum body drops radially. The same damping stop member can thus be associated with a pendulum body to dampen all of the aforementioned contact between the pendulum body and the support.

Everything below applies equally to the first and second embodiments mentioned above, provided that the pendulum damping device comprises a single support and pendulum bodies with two pendulum masses.

Each pendulum body comprises for example two connecting members pairing each pendulum mass of this body, each connecting member being rigidly connected to each of these pendulum masses.

The support can be made in one piece, being for example entirely metal.

In a preferred variant of the first or second embodiment, the rolling member can engage with a single first rolling track rigidly connected to the support and with a single second rolling track rigidly connected to the pendulum body, and this second rolling track is defined by a connecting member of the pendulum body. One portion of the outline of this connecting member defines for example the second rolling track. In one variant, a coating can be deposited on this portion of the outline of this connecting member to form the second rolling track. Such a connecting member is for example force-fitted via each of its axial ends into an opening made in one of the pendulum masses. In one variant, the connecting member can be welded or screwed or riveted via its axial ends to each of the first and second pendulum masses.

Each rolling member can in this case be solely stressed in compression between the first and second rolling tracks mentioned above. These first and second rolling tracks engaging with the same rolling member can be at least partially radially facing, i.e. there are planes perpendicular to the axis of rotation in which these rolling tracks both extend.

According to this preferred variant, each rolling member can be received in a window of the support that already receives a connecting member and does not receive any other rolling member. This window is for example defined by a closed outline a portion of which defines the first rolling track rigidly connected to the support that engages with this rolling track.

Still according to this preferred variant, the same surface of the rolling member, which can belong to the part of the rolling member inside which the other part of the rolling member is received according to the first embodiment above, and which can belong to the rolling part according to the second embodiment above, rolls alternately on the first rolling track and on the second rolling track.

According to this preferred variant, the axial clamping exerted can keep the rolling member in contact with the connecting member as much as possible, including when the internal combustion or electric engine of the vehicle stops.

According to another preferred variant of the first or second embodiment above, each rolling member engages with a single first rolling track rigidly connected to the support, and with two second rolling tracks rigidly connected to the pendulum body. In this case, each pendulum mass has an opening part of the outline of which defines one of these second rolling tracks.

According to this other preferred variant, each connecting member includes for example several rivets, and this connecting member is received in a window of the support, while the rolling member is received in an opening of the support, separate from a window receiving a connecting member. According to this other preferred variant, each connecting member can as a variant be a rivet.

According to this other preferred variant, when two rolling members guide the movement of the pendulum body relative to the support, each rolling member engages with a first rolling track dedicated to this rolling member and with two second rolling tracks dedicated to this rolling member.

According to this second preferred variant, each rolling member can then comprise axially in succession:
one portion arranged in an opening of the first pendulum mass and engaging with the second rolling track formed by part of the outline of this opening,
one portion arranged in an opening of the support and engaging with the first rolling track formed by part of the outline of this opening, and
one portion arranged in an opening of the second pendulum mass and engaging with the second rolling track formed by part of the outline of this opening.

In all of the above, the device can comprise at least one interstitial part at least one part of which is axially arranged between the support and a pendulum mass of the pendulum body. The interstitial part is for example fixed to a pendulum mass or the support or formed by a coating deposited on a pendulum mass or on the support. Such an interstitial part can thus limit the axial movement of the pendulum body relative to the support, thus preventing the axial impacts between said parts, and thus undesirable wear and noise, particularly when the support and/or the pendulum mass are made from metal. Several interstitial parts, for example in the form of pads, can be envisaged. The interstitial parts are particularly made from a damping material, such as plastic or rubber.

The interstitial parts are for example held by the pendulum bodies, being particularly fixed to the pendulum bodies. The interstitial parts can be positioned on a pendulum body so that there is always at least one interstitial part at least a part of which is axially inserted between a pendulum mass and the support, regardless of the relative positions of the support and said mass during the movement of the pendulum body relative to the support. One or more holes can be made in the interstitial part(s) to allow contact through this hole of the rolling member and the pendulum body holding this or these interstitial part(s).

When damping stop members are present, each of them can be dedicated to a connecting member of the pendulum body and held by the latter. Each damping stop member can in this case have a cylindrical shape with an axis parallel to the axis of rotation of the support.

Each damping stop member can have elastic properties enabling the damping of the impacts linked to the contact between the support and the pendulum body. This damping is then enabled by the compression of the damping stop member. The damping stop member is for example made from an elastomer or from rubber.

The invention also relates, according to another aspect thereof, to a pendulum damping device, comprising:
a single support capable of rotating about an axis,
at least one pendulum body comprising: first and second pendulum masses axially spaced apart from each other and mobile relative to the support, the first pendulum mass being arranged axially on a first side of the support, and the second pendulum mass being arranged axially on a second side of the support, and at least one connecting member of the first and second pendulum masses pairing said masses, and
at least one rolling member guiding the movement of the pendulum body relative to the support, the rolling member engaging with a rolling track rigidly connected to the support and with at least one rolling track rigidly connected to the pendulum body, the rolling member comprising:
a first part axially facing the first pendulum mass,
a second part axially facing the second pendulum mass, and
an elastic element arranged in the rolling member so as to axially separate these two parts so that the rolling member exerts an axial clamping force on at least one of the pendulum masses during the movement of this pendulum mass relative to the support.

The invention also relates, according to another aspect thereof, to a pendulum damping device, comprising:
two rigidly connected supports capable of rotating about an axis, defining an axial space between them,
at least one pendulum body arranged in this axial space, and
at least one rolling member guiding the movement of the pendulum body relative to the support, the rolling member engaging with a rolling track rigidly connected to each support and with at least one rolling track rigidly connected to the pendulum body, the rolling member comprising:
a first part axially facing the first of the two supports,
a second part axially facing the second of the two supports, and
an elastic element arranged in the rolling member so as to axially separate these two parts so that the rolling member exerts an axial clamping force on at least one of the two supports during the movement of the pendulum body relative to the supports.

The invention also relates, according to another aspect thereof, to a component for a vehicle power train, the component particularly being a dual mass flywheel, a hydrodynamic torque converter or a clutch disc of a clutch, or a hybrid power train component, or a single wet clutch or a dry or wet dual clutch, this component comprising a pendulum damping device as defined above.

The support of the pendulum damping device can in this case be one of:
a disc of the component,
a drive washer of the component,
a phase washer of the component, or
a support separate from said disc, said drive washer and said phase washer.

The invention also relates, according to another aspect thereof, to a vehicle power train comprising:
an internal combustion engine for propelling the vehicle, particularly with two, three or four cylinders, and
a component as defined above.

Figure 1:
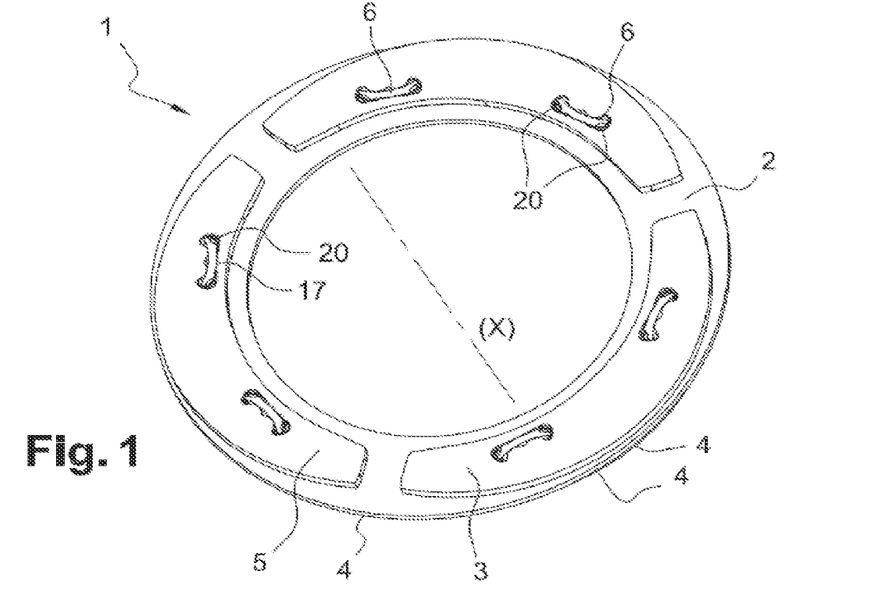
FIG. 1 diagrammatically shows a pendulum damping device to which the invention applies.

The invention will be more clearly understood on reading the following description of a non-limitative embodiment thereof and with reference to the attached drawing, in which:

FIG. 1 shows a pendulum damping device 1.

The damping device 1 is of the oscillating pendulum type. The device 1 is particularly capable of being provided in a motor vehicle transmission system, being for example incorporated into a component, not shown, of such a transmission system, this component being for example a dual mass flywheel, a hydrodynamic torque converter or a clutch disc of a clutch.

This component can form part of a power train of a motor vehicle, this power train comprising an internal combustion engine particularly with two, three or four cylinders.

In FIG. 1, the device 1 is at rest, that is, it is not filtering the torsional oscillations transmitted by the drive chain due to the acyclisms of the internal combustion engine.

In a known manner, such a component can comprise a torsion damper having at least one input element, at least one output element, and circumferentially acting elastic return members that are inserted between said input and output elements.

In the present application, the terms "input" and "output" are defined relative to the direction of transmission of torque from the internal combustion engine of the vehicle to the wheels thereof.

In the example under consideration, the device 1 comprises:
 a support 2 capable of rotating about an axis X, and
 a plurality of pendulum bodies 3 mobile relative to the support 2.

According to the embodiments of the invention described hereinafter, there is just one support 2. In addition, it will be observed in FIG. 1 that three pendulum bodies 3 are provided, being distributed evenly about the circumference of the axis X.

The support 2 of the damping device 1 can be made up of:
 an input element of the torsion damper,
 an output element,
 an intermediate phasing element arranged between two series of springs of the damper, or
 an element rotatably connected to one of the aforementioned elements and separate therefrom, being in this case for example a support belonging to the device 1.

The support 2 is particularly a drive washer or a phase washer. The support can also be another member, for example a flange of the component.

In the examples under consideration, the support 2 is generally annular, including two opposite sides 4 that here are flat faces.

As can particularly be seen in FIG. 1, each pendulum body 3 comprises in the examples under consideration:
 two pendulum masses 5, each pendulum mass 5 extending axially facing one side 4 of the support 2, and
 two connecting members 6 rigidly connecting the pendulum masses 5.

The connecting members 6, also called "spacers" are angularly offset in the examples under consideration.

In the example in FIG. 1, each connecting member 6 is rigidly connected to the pendulum masses 5 by being force-fitted via each of its ends into an opening 17 made in one of the pendulum masses 5. In variants not shown, each connecting member 6 can be screwed or riveted onto each pendulum mass 5, or each end of a connecting member 6 is rigidly connected to one of the pendulum masses 5 by welding.

The device 1 also comprises rolling members 11 guiding the movement of the pendulum bodies 3 relative to the support 2. Here, the rolling members 11 are rollers having several different successive diameters or otherwise. Each rolling member 11 thus has a longitudinal axis Y parallel to the axis of rotation X of the support 2. These rolling members 11 will be described in greater detail below.

In the example described, the movement of each pendulum body 3 relative to the support 2 is guided by two rolling members 11.

Each rolling member 11 is received in a window 19 made in the support 2. In the examples under consideration, each window 19 only receives one rolling member 11.

Each rolling member engages with a rolling track 12 rigidly connected to the support 2 and here formed by a portion of the edge of the window 19, and with a rolling track 13 rigidly connected to the pendulum body 3 and defined by a portion of the radially outer edge of the connecting member 6.

Figure 7:
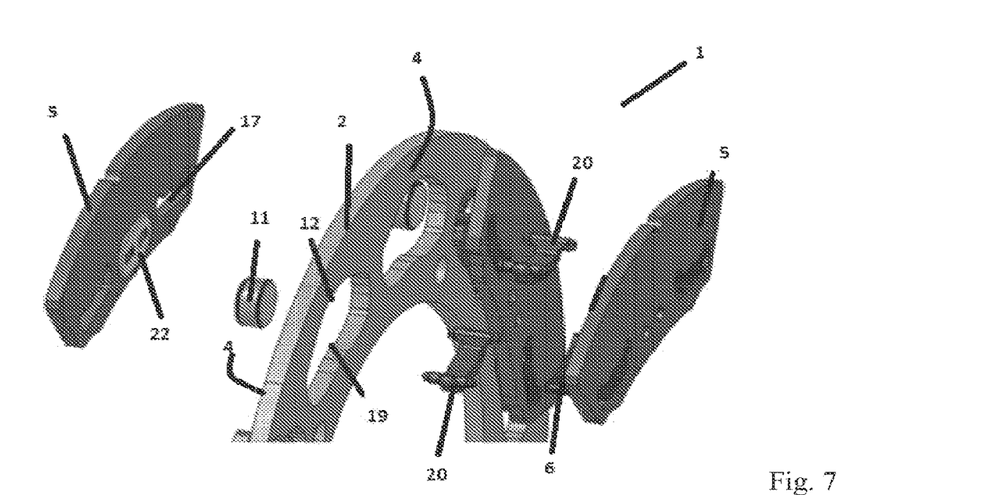

The device 1 also comprises damping stop members 20 that can be seen in FIGS. 1 and 7. In the examples described, a single damping stop member is associated with the same connecting member 6, this single damping stop member damping the impacts between the pendulum body 3 and the support 2:
 following a movement in a counter-clockwise direction of this pendulum body 3 from the rest position to filter a torsional oscillation, and
 following a movement in a clockwise direction of this pendulum body from the rest position to filter a torsional oscillation, and
 if the pendulum body drops radially, for example when the internal combustion engine of the vehicle stops.

As can be seen for example in FIG. 7, pads 22 can be provided, one pad being held here by each pendulum mass 5 to dampen the axial impacts between the pendulum masses and the support.

Two embodiments of the invention will now be described in more detail with reference to FIGS. 2 to 12, enabling axial clamping to be exerted by each rolling member 11 on the pendulum body 3 the movement of which it guides in order to limit or even prevent any relative radial and/or angular movement between this rolling member 11 and the connecting member 6 of this pendulum body on which it rolls, when the internal combustion or electric engine of the vehicle stops.

According to the first embodiment, described with reference to FIGS. 2 to 6, the rolling member 11 includes an elastic element 30 housed inside this rolling member. According to this first embodiment, the elastic element 30 does not thus define the periphery of the rolling member 11.

Figure 2:
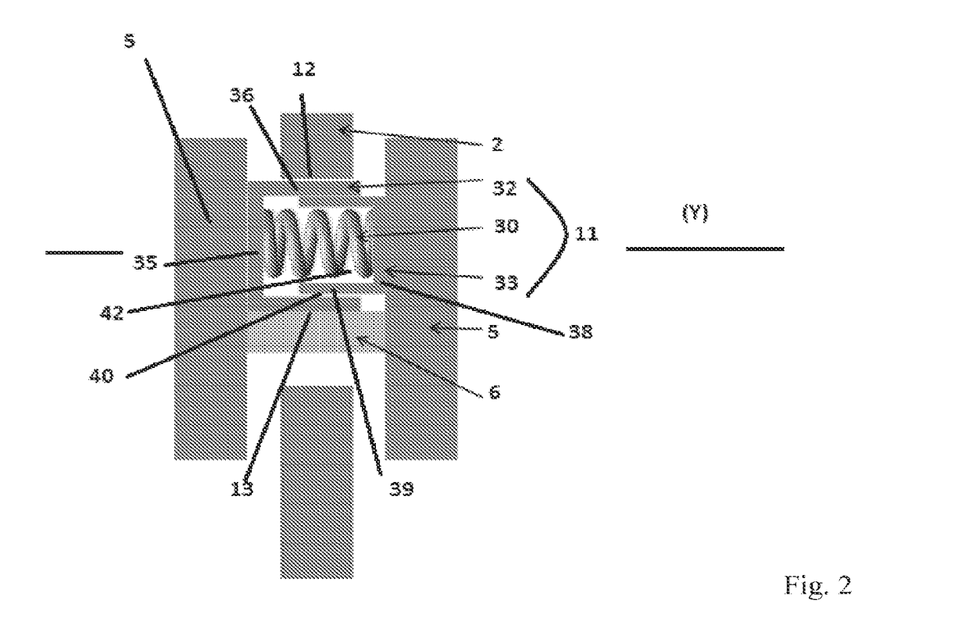
FIG. 2 shows a cross-section of a rolling member according to a first embodiment of the invention.

According to this first embodiment, the rolling member 11 comprises a first part 32 and a second part 33. The first part 32 defines the end of the rolling member 11 arranged facing the first pendulum mass 5 of the pendulum body 3 while the second part 33 defines the end of the rolling member 11 arranged facing the second pendulum mass 5 of this pendulum body 3.

In the example under consideration, each of the first part 32 and the second part 33 is hollow, being C-shaped in the plane of FIG. 2. The first part 32 thus comprises a bottom wall 35 that defines the end of the rolling member arranged facing the first pendulum mass 5 and that is capable of rubbing against this first pendulum mass 5. A side wall 36 extends from this bottom wall 35 towards the second pendulum mass 5. Similarly, the second part 33 comprises in the example under consideration a bottom wall 38 that defines the end of the rolling member arranged facing the second pendulum mass 5. A side wall 39 extends from this bottom wall 38 towards the first pendulum mass 5. It will be noted in FIG. 2 that the side wall 36 of the first part is cylindrical and has an outer surface that rolls alternately on the aforementioned first rolling track 12 and second rolling track 13.

As shown in FIG. 2, the first part 32 defines a cavity 40 and the second part 33 defines a cavity 42. The cavity 40 receives a fraction of the second part 33, but also a portion of the elastic element 30 another portion of which is received in the cavity 42. Each of these portions of the elastic element 30 can be fixed in the corresponding cavity 40, 42. The outer face of the fraction of the second part 33 received in the cavity 40 rubs for example against the inner face facing the side wall 36 of the first part 32.

Figure 3:
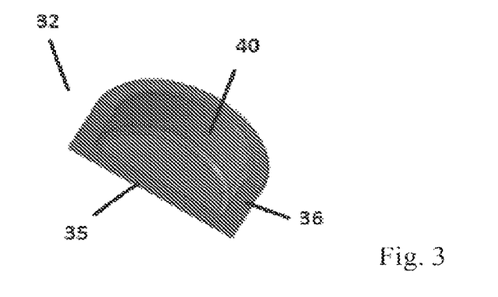
FIGS. 3 to 6 show in isolation different variants of the first part of the rolling member in FIG. 2, FIGS. 7 and 8 are exploded and assembled views respectively of a pendulum damping device with a rolling member according to a second embodiment of the invention.
Figure 4:
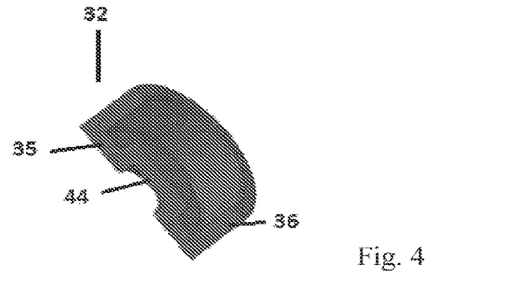
Figure 5:
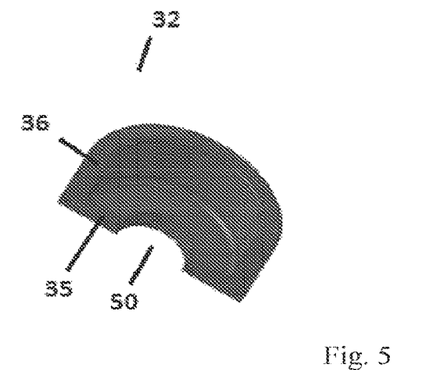

Different variants of the first part 32 of the rolling member 11 will now be described with reference to FIGS. 3 to 6. In FIG. 3, the bottom wall 35 is flat and solid, that is, it is not provided with holes or bosses. In FIG. 4, the bottom wall 35 is still solid but it has a stepped shape, the central area 44 thereof being closer to the second part 33 of the rolling member 11 than the rest of this bottom wall 35. In FIG. 5, the bottom wall 35 is flat but it comprises a through-hole 50.

Figure 6:
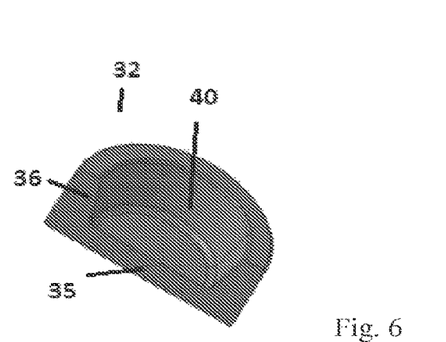

The first part 32 in FIGS. 3 to 5 has a side wall 36 with a constant thickness. The invention is not limited to this, as shown in FIG. 6, in which this side wall narrows moving away from the bottom wall 35. In other variants not shown, a side wall 36 according to FIG. 6 can be provided on the first parts 32 in FIGS. 3 to 5.

As a variant or in addition, the second part 33 of the rolling member 11 can be produced in a similar way to that described above with reference to FIGS. 3 to 6.

In FIG. 2, the elastic element 30 is a coil spring but other embodiments are possible.

This elastic element 30 axially separates the first part 32 from the second part 33 so that each of these parts 32, 33 rubs against the pendulum mass 5 of the pendulum body 3 facing which it is arranged.

According to FIGS. 3 to 6, the side wall 36 can have a thickness of at least 1.5 mm, this thickness being able to be up to half of the axial dimension of the rolling member 11.

A second embodiment of the invention will now be described with reference to FIGS. 7 to 12.

According to this second embodiment, the elastic element is no longer arranged inside the rolling member 11, but this elastic element 30 defines part of the periphery of the rolling member 11.

Figure 8:
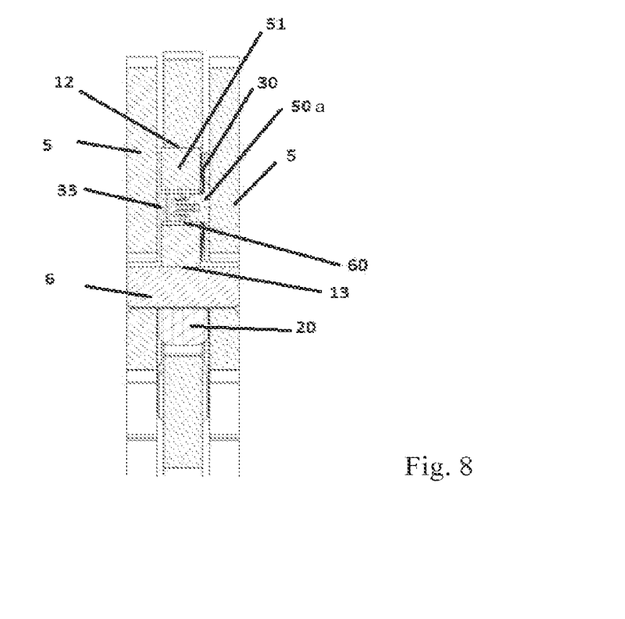

Here, the first part 32 is no longer a single piece, unlike in the first embodiment as described above. Here, this first part comprises a first fastening part 50a and a rolling part 51. Here, the rolling part 51 is hollow, extending between an outer cylindrical surface 52 and an inner cylindrical surface 53. In the example described, the outer cylindrical surface 52 rolls alternately on the first rolling track 12 and the second rolling track 13. The inner cylindrical surface defines a recess 60 that will be described below.

Here, the second part 33 is a single piece, defining a second fastening part. In the example under consideration, the first and second fastening parts are made from plastic while the rolling part 51 is made from steel.

Figure 9:
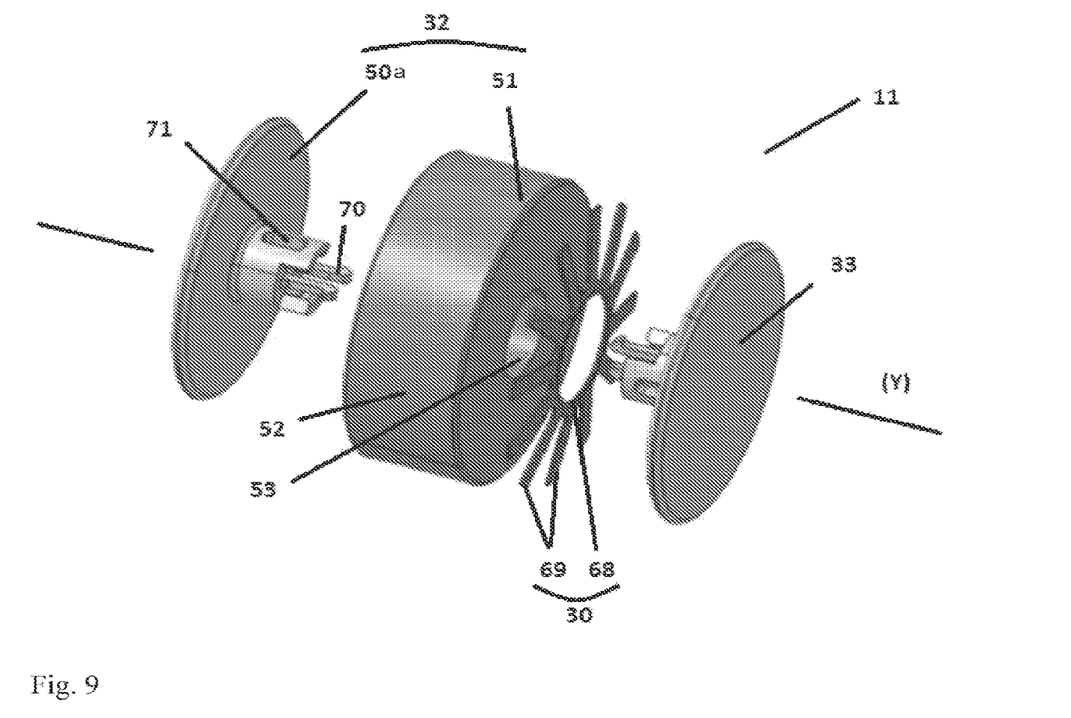
FIGS. 9 to 11 show the rolling member in FIGS. 7 and 8 in different states.

It will be noted in FIGS. 8 and 9 that the elastic element 30 locally defines the periphery of the rolling member 11, between the first part 32 and the second part 33 of the latter.

Here, the elastic element 30 is a washer squeezed between the first part 32 and the second part 33 when the axial clamping force is exerted. As can be seen in FIGS. 8 and 9, the rolling member comprises axially in succession: the first fastening part 50a, the rolling part 51, the elastic element 30 and the second fastening part 33.

Here, this washer 30 has an annular central part 68 from which a plurality of arms 69 extend radially outwards. These arms 69 are distributed evenly about the longitudinal axis Y of the rolling member.

In the example under consideration, the first fastening part 50a and the second fastening part 33 are configured to establish a removable fastening between them through the rolling part 51. Here, each of the first fastening part 50a and the second fastening part 33 comprises an axial extension extending in the recess 60 and holds catches 70 and lugs 71, so as to establish this removable fastening. The axial dimension of each lug 71 can make it possible to prevent the catch 70 from abutting axially against the edge of this lug furthest away from the fastening part holding this catch 70.

In one variant, a part 50a, 33 can include a single catch 70 and a single lug 71 respectively.

Figure 10:
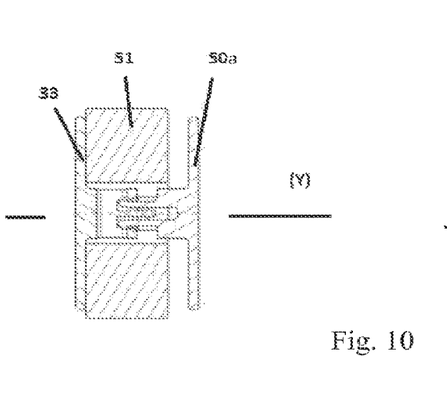
Figure 11:
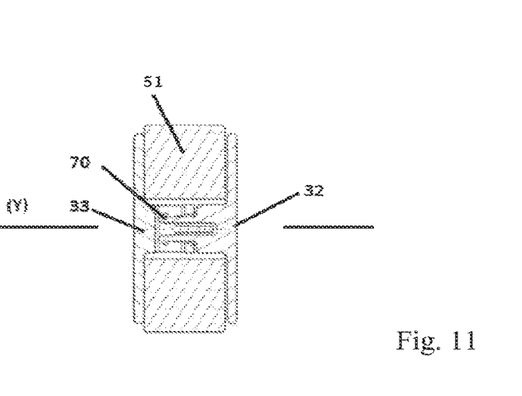

FIGS. 10 and 11, in which the washer 30 is not shown, show that a relative movement is possible between the first fastening part 50a and the second fastening part 33, including when the catches 70 are received in the lugs 71. The amplitude of this relative movement is determined by the axial dimension of the lugs 71.

According to the second embodiment as described above, the elastic element 30 pushes the second fastening part 33 against the second pendulum mass 5 of the pendulum body 3. This second fastening part 33 has a surface orthogonal to the axis Y that will rub against the second pendulum mass 5 to exert the axial clamping.

In all of the above, each rolling member 11 can have a mass of the order of 3 g to 11 g, for example 10 g, and the axial clamping can correspond to a tangential force of the order of 0.5 N.

Figure 12:
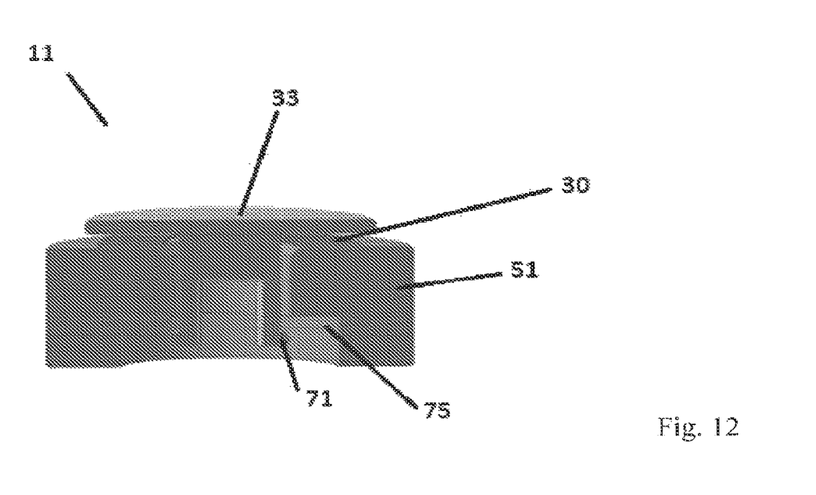
FIG. 12 shows a rolling member according to a variant of the second embodiment of the invention.

FIG. 12 shows a variant of the second embodiment in which the rolling member 11 is not provided with a first fastening part 50a. Here, the catches 70 of the second fastening part 33 engage directly with the wall of a boss 75 made in the rolling part 51.

In other examples, the pendulum damping device 1 comprises two supports 2 axially offset from and rigidly connected to each other. A pendulum body 3 is axially received between these two supports 2 and its movement is guided relative to the supports 2 by two rolling members 11. Each of the latter is provided with an elastic element 30 that enables axial clamping to be exerted by each rolling member 11 on the supports 2.

Figure 13:
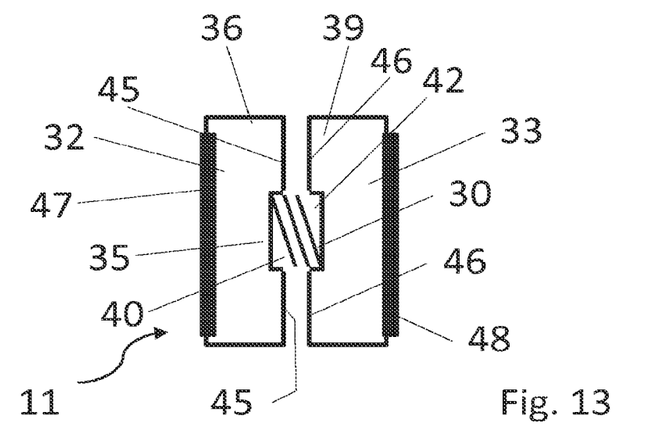
FIG. 13 shows in isolation a cross-section of another variant of the rolling member in FIG. 2.
Figure 14:
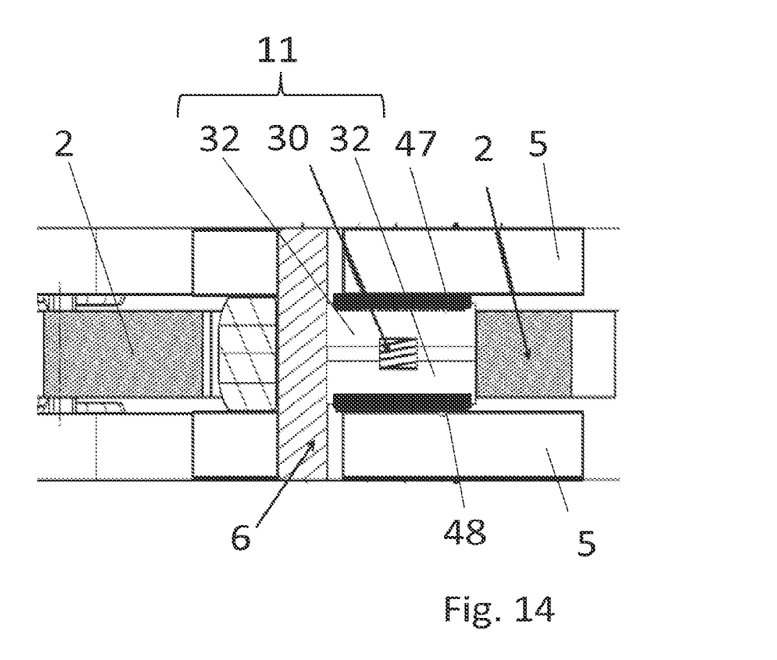
FIG. 14 shows a cross-section of a rolling member according to a variant of the first embodiment of the invention.

As shown in FIGS. 13 and 14, the first part 32 defines a cavity 40 and the second part 33 defines a cavity 42. The cavity 40 receives a first portion of the elastic element 30 and the cavity 42 receives a second portion of the elastic element 30. Each of these portions of the elastic element 30 can be fixed in the corresponding cavity 40, 42.

In one alternative, one of the parts 32, 33 can be allowed to roll independently relative to the other, and as a result the elastic element 30 can only be fixed in one of the cavities 40, 42. In one variant, the elastic element 30 can also be held by the side walls 36, 39 and the force that it exerts on the bottom wall 35 only. An outer face 45, 46 can extend radially from the ends of the side walls 36 and 39 respectively. The outer face 45 of the side wall 36 faces the outer face 46 of the side wall 39.

In the example shown in FIGS. 13 and 14, the rolling member 11 comprises at least one pad 47, 48 and preferably pads 47, 48. The pads 47, 48 can be made from plastic. Each pad 47, 48 can be rigidly connected to the first or the second axial end respectively. The pads 47, 48 prevent direct contact between the rolling member 11 and at least one of the pendulum masses 5. The noise and wear are thus further reduced.

This variant of the first embodiment of the invention can be combined with the variants described with reference to FIGS. 3 to 6.

Figures 15, 16:
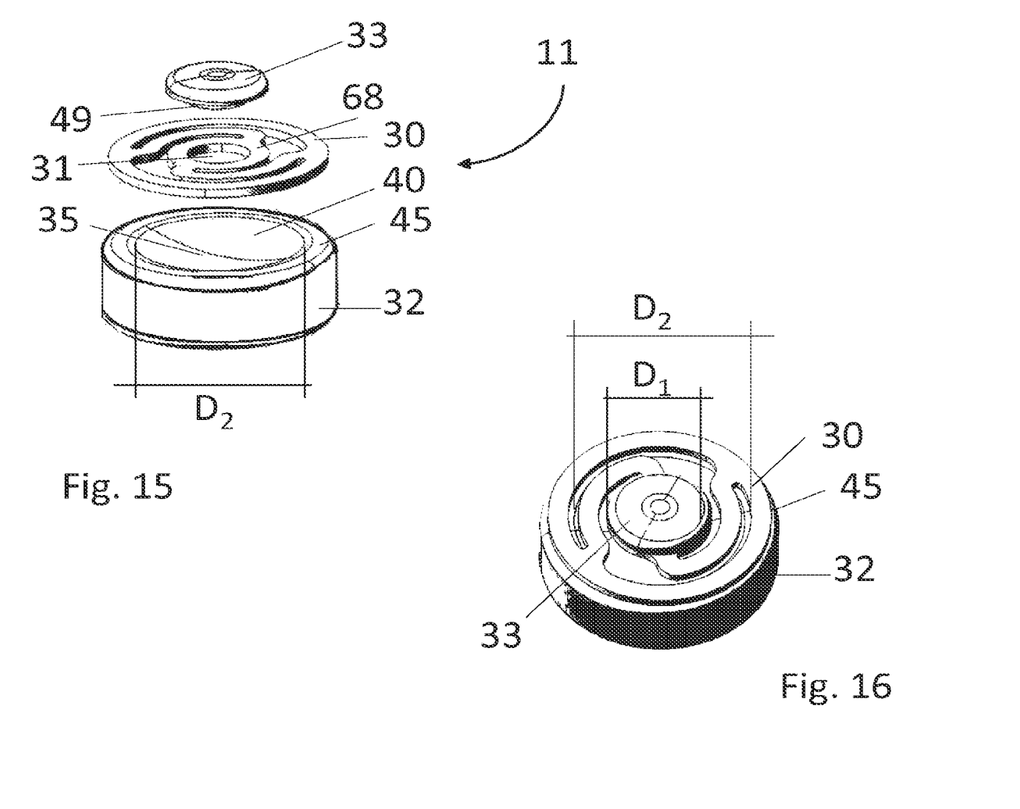
FIGS. 15 and 16 show in isolation another variant of the rolling member according to a first embodiment of the invention.

As shown in FIGS. 15 and 16, the first part 32 defines a concave face. To this end, the first part 32 can comprise the cavity 40 opening out axially. The elastic element 30 is fixed to the outer face 45 of the first part 32 of the rolling member 11. The outer face 45 forms an outer edge of the concave face of the first part 32. The elastic element 30 is therefore rotatably fixed to the first part 32 of the rolling member 11. The second part 33 of the rolling member 11 is captively fixed to the elastic element 30. More particularly, the second part 33 is captively arranged in the center 31 of the elastic element 30. The cavity 40 of the first part 32 of the rolling member 11 is capable of at least partially accommodating the elastic element 30 and the second part 33 of the rolling member 11. The second part 33 of the rolling member 11 includes a protuberance 49 instead of a cavity. The protuberance 49 is capable of being housed in the center 31 of the elastic element 30. The protuberance 49 can be force-fitted into the center 31 of the elastic element 30.

The outer diameter D1 of the second part 33 of the rolling member is smaller than the inner diameter D2 of the first part 32 of the rolling member 11.

Figure 17:
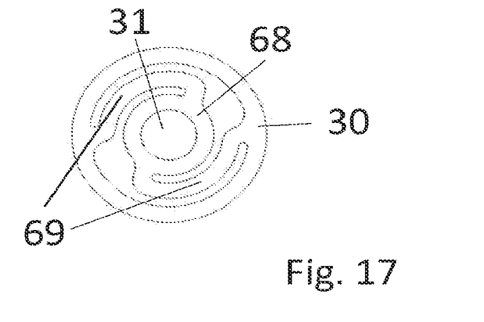
FIG. 17 shows an example of a shape of an elastic element.

FIG. 17 shows an elastic element 30. In particular, the elastic element 30 shown is a washer with two arms 69. The elastic element 30 includes at its center 31 a hole in order to be able to accommodate the second part 33 of the rolling member 11.

Different variants of the second part 33 of the rolling member 11 will now be described with reference to FIGS. 18 to 24. In these examples, the second part 33 of the rolling member 11 is annular. The central part 68 of the elastic element 30, shown here in a simplified manner, is capable of acting as a connector to the first part 32. The first part 32 includes the rolling part 51. The rolling part 51 can comprise an outer cylindrical surface 52.

Figure 18:
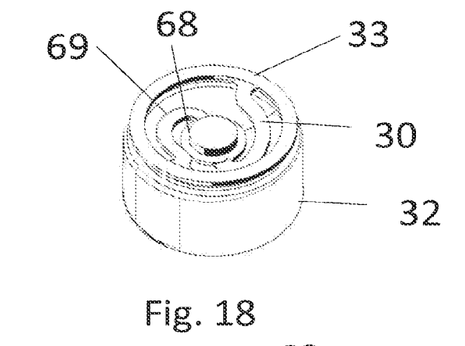
FIGS. 18 to 24 show in isolation different elastic elements incorporated into the second part of the rolling member according to variants of the second embodiment of the invention.

In FIG. 18, the two arms 69 of the elastic element 30 incorporated into the second part 33 of the rolling member 11 are S-shaped. The two arms 69 can be arranged on either side of the central part 68.

Figure 19:
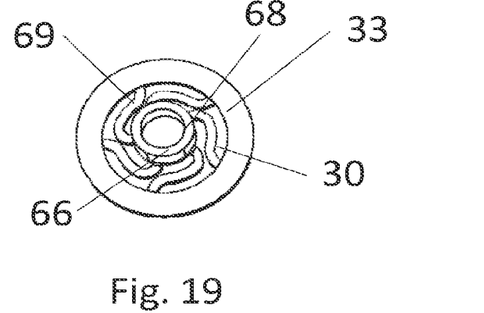

In FIG. 19, the elastic element 30 incorporated into the second part 33 of the rolling member 11 still includes S-shaped arms 69, but this is an elongated S-shape. The elastic element 30 includes for example five arms 69, distributed evenly about the central part 68.

Figure 20:
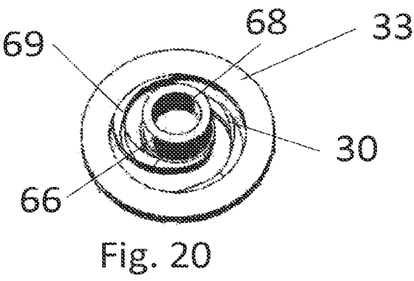

In FIG. 20, the arms 69 respectively describe an arc. The elastic element 30 includes two arms arranged on either side of the central part 68.

Figure 21:
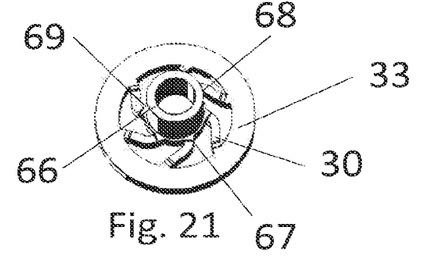

In FIG. 21, the arms 69 include a bend 67 and there are five arms 69, distributed evenly about the central part 68.

The connecting central part 68 can comprise, as shown in FIGS. 19 to 21, a central protuberance 66. The drawings are generic, and the connection can be produced as described in FIGS. 8 to 10 or 22.

Figure 22:
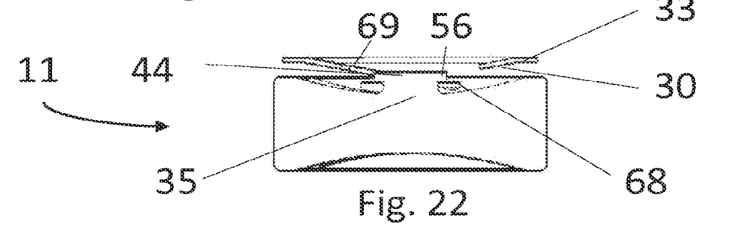

FIG. 22 shows a system for fastening the central part 68 of the elastic element 30 to the first part 32 of the rolling member 11. The bottom wall 35 is solid but has a stepped shape. The central area 44 of the bottom wall 35 can be closer to the second part 33 of the rolling member 11 than the rest of this bottom wall 35. The central area 44 is in the form of an annular catch 56, in order to be able to accommodate and hold captive the central part 68 of the elastic element 30.

Figure 23:
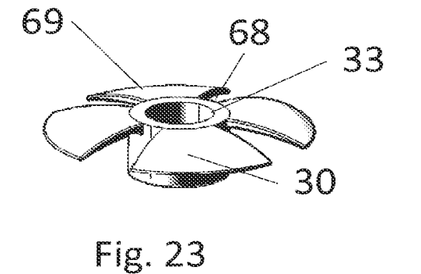
Figure 24:
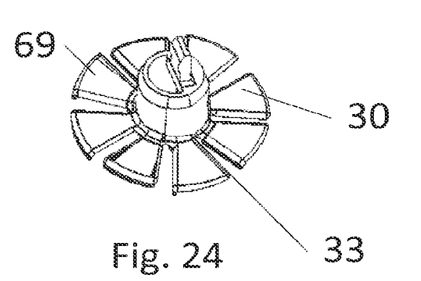

In FIGS. 23 and 24, the elastic element 30 incorporated into the second part 33 of the rolling member 11 has arms 69. A plurality of arms 69 extends radially outwards from the central part 68. These arms 69 are distributed evenly about the longitudinal axis Y of the rolling member 11.

Figure 25:
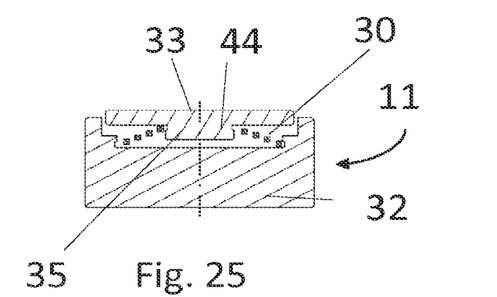
FIG. 25 shows in isolation a cross-section of another variant of the rolling member in FIG. 2, and FIGS. 26 to 34 show variants comprising a tapered coil spring.

FIG. 25 shows a cross-section of a variant of a first embodiment of the invention. The second part 33 no longer includes a cavity, but a protrusion forming the bottom wall 35. The bottom wall 35 has a stepped shape, the central area 44 thereof being closer to the first part 32 of the rolling member 11 than the rest of this bottom wall 35. The central area 44 acts as a fastener for the elastic element 30. The elastic element 30 is shown as a tapered coil spring.

Figure 26:
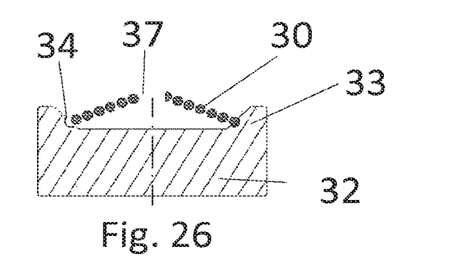
Figures 27, 28, 29:
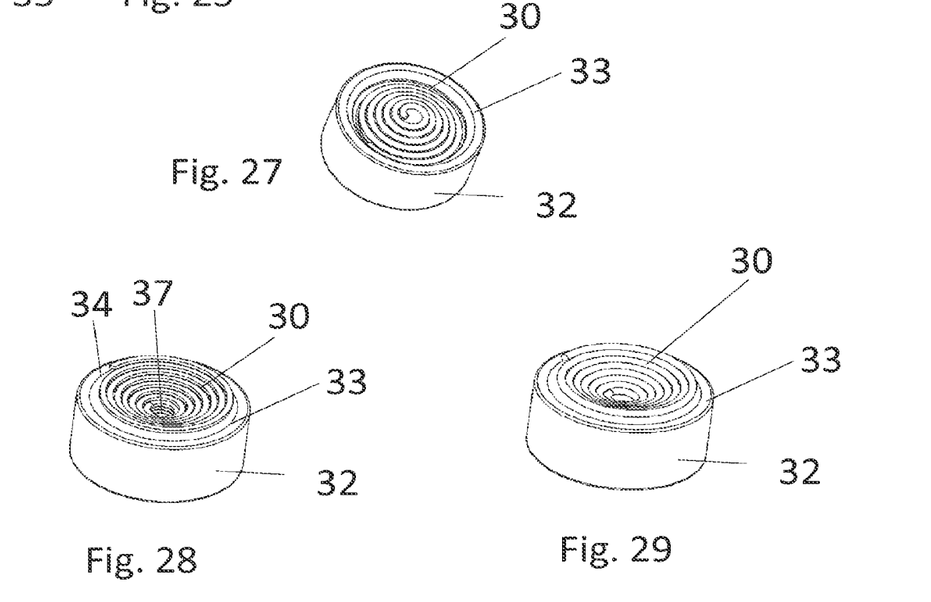

FIG. 26 shows a cross-section and FIG. 27 shows a perspective view of a variant of the first embodiment of the invention. The second part 33 of the rolling member no longer includes a bottom wall, and the side wall is incorporated into the first part 32 of the rolling member 11. The elastic element is shown as a tapered coil spring. It is held at its base 34 between the first part 32 and the second part 33 of the rolling member 11. The vertex 37 of the elastic element 30 can be in contact with the pendulum body 3, exerting an axial clamping force on the pendulum body.

Figure 30:
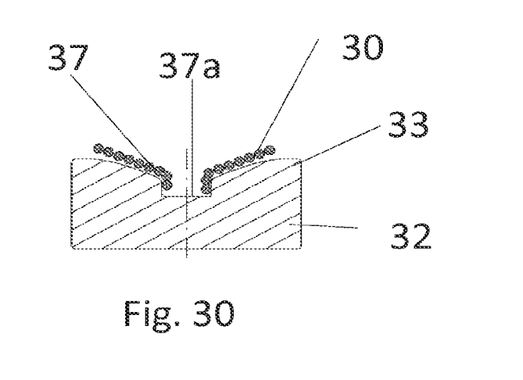

FIGS. 28, 29, 30 show a variant of the first embodiment of the invention similar to FIGS. 26 and 27. Only the elastic element 30, the tapered coil spring, is held at its vertex 37 in a recess 34a made between the first part 32 and the second part 33 of the rolling member 11. The base 34 of the elastic element is in contact with the pendulum body 3, exerting an axial clamping force on the pendulum body.

Figure 31:
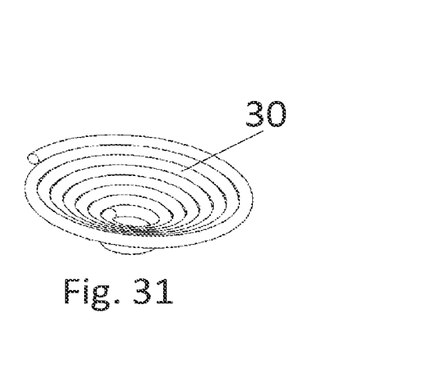

FIG. 31 shows in isolation a tapered coil spring according to FIGS. 28 to 30. The wire from which the tapered coil spring is made can be round or flat as shown in FIGS. 29, 28 respectively.

Figure 32:
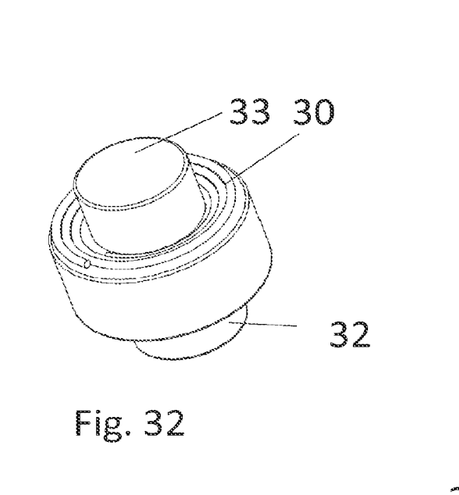
Figure 33:
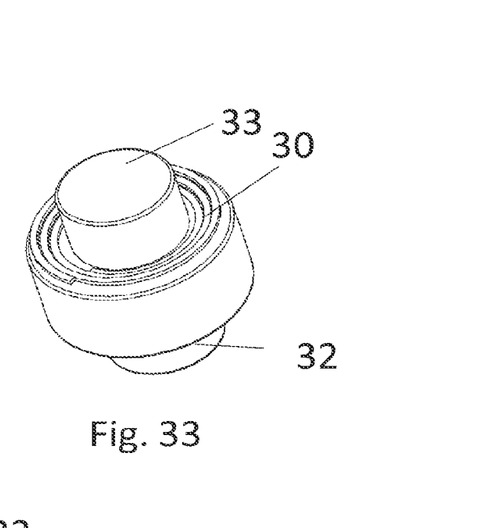
Figure 34:
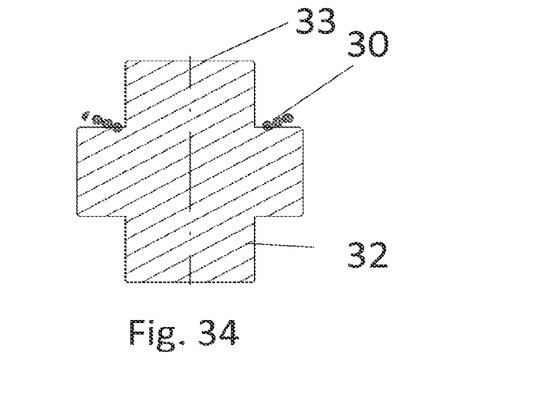

FIGS. 32 to 33 show variants of the last embodiments of a rolling member 11 having cylindrical surfaces of different diameters.

The invention is not limited to the examples that have just been described.

The invention claimed is:

1. A pendulum damping device, comprising:
   a support configured to rotate about an axis,
   at least one pendulum body and
   at least one rolling member guiding the movement of the pendulum body relative to the support, the rolling member engaging with at least one rolling track rigidly connected to the support and with at least one rolling track rigidly connected to the pendulum body,
   the rolling member comprising:
   a first part defining a first axial end,
   a second part defining a second axial end, and
   an elastic element arranged in the rolling member so as to axially separate the first part and the second part so that the rolling member exerts an axial clamping force on one of the pendulum body and the support during the movement of the pendulum body relative to the support.

2. The device as claimed in claim 1, wherein the elastic element includes at least one portion received axially inside a cavity in one of the first part and the second part of the rolling member.

3. The device as claimed in claim 2, wherein the cavity extending from a bottom wall, the bottom wall being closed or comprising a hole, and the cavity extending along a side wall, the side wall having a cylindrical shape or otherwise moving away from the bottom wall.

4. The device as claimed in claim 2, wherein the elastic element includes a first portion received axially inside a cavity made in the first part of the rolling member and including a second portion received axially inside a cavity in the second part of the rolling member.

5. The device as claimed in claim 2, wherein one of the first part and the second part of the rolling member being arranged inside the other of the first part and the second part of the rolling member.

6. The device as claimed in claim 5, wherein the part of the rolling member inside which the other part of the rolling member is arranged including an outer surface engaging with the rolling track rigidly connected to the support and with the rolling track rigidly connected to the pendulum body.

7. The device as claimed in claim 1, wherein the elastic element locally defining the periphery of the rolling member, between the first part and the second part of the rolling member.

8. The device as claimed in claim 7, wherein the elastic element is a washer squeezed between the first part and the second part of the rolling member when the axial clamping force is exerted.

9. The device as claimed in claim 7, wherein the first part includes a first fastening part and a rolling part, the second part including a second fastening part, and the rolling member includes axially in succession: the first fastening part, the rolling part, the elastic element and the second fastening part.

10. The device as claimed in claim 9, wherein the rolling part is hollow and the first fastening part and the second fastening part are fastened inside the rolling part.

11. The device as claimed in claim 9, wherein the first fastening part and the second fastening part are configured to establish a removable fastening between them.

12. The device as claimed in claim 9, wherein the first and the second fastening parts being plastic and the rolling part being metal.

13. The device as claimed in claim 9, wherein the rolling part includes an outer surface engaging with the rolling track rigidly connected to the support and with the rolling track rigidly connected to the pendulum body.

14. The device as claimed in claim 1, wherein the pendulum body includes first and second pendulum masses axially spaced apart from each other and mobile relative to the support, the first pendulum mass being arranged axially on a first side of the support, and the second pendulum mass being arranged axially on a second side of the support, and at least one connecting member of the first and second pendulum masses pairing said masses, the first end of the rolling member being axially facing the first pendulum mass and the second end of the rolling member being axially facing the second pendulum mass, and the axial clamping force being exerted on at least one of the pendulum masses of the pendulum body.

15. The device as claimed in claim 14, wherein the rolling member exerts on the pendulum body or on the support axial clamping corresponding to a tangential force of between 0.15 N and 1.5 N.

16. The device as claimed in claim 14, wherein the elastic element axially separates the first part and the second part of the rolling member so that the rolling member exerts an axial clamping force on each pendulum mass of the pendulum body during the movement of the pendulum body relative to the support.

17. The device as claimed in claim 1, wherein the elastic element is a single part with at least one of the first part and the second part.

18. A vehicle power train component, being one of a dual mass flywheel, a clutch disc, a single wet clutch, a dry or wet dual clutch, a hydrodynamic torque converter and a hybrid component, comprising a pendulum damping device as claimed in claim 1.

19. The device as claimed in claim 1, comprising two rigidly connected supports configured to rotate about an axis, defining an axial space between them, at least one pendulum body arranged in this axial space, and at least one rolling member guiding the movement of the pendulum body relative to the support, the rolling member engaging with a rolling track rigidly connected to each support and with at least one rolling track rigidly connected to the pendulum body.

20. The device as claimed in claim 19, wherein the first part of the rolling member axially facing the first of the two supports, the second part of the rolling member axially facing the second of the two supports, and the elastic element arranged in the rolling member so as to axially separate these two parts so that the rolling member exerts an axial clamping force on at least one of the two supports during the movement of the pendulum body relative to the supports.

* * * * *